United States Patent [19]

Reynolds et al.

[11] Patent Number: 4,917,402
[45] Date of Patent: Apr. 17, 1990

[54] TORSION SPRING CARTRIDGE ASSEMBLY

[75] Inventors: Norm Reynolds, Franklin; Wilbur C. Reynolds, Muskego, both of Wis.; Charles F. Wharton, Lake Bluff, Ill.

[73] Assignee: Reynolds Torsion System, Inc., Muskego, Wis.

[21] Appl. No.: 31,224

[22] Filed: Mar. 26, 1987

Related U.S. Application Data

[63] Continuation of Ser. No. 781,149, Aug. 14, 1985, abandoned.

[51] Int. Cl.[4] .............................................. B60G 3/00
[52] U.S. Cl. ..................................... 280/700; 267/154; 267/196; 267/278; 280/63; 280/414.2; 280/664; 280/723; 280/789
[58] Field of Search ................ 267/154, 155, 156, 278, 267/196, 198; 280/63, 664, 700, 721, 723, 789, 414.1, 414.2

[56] References Cited

U.S. PATENT DOCUMENTS

| 1,338,556 | 4/1920 | Craig | 188/130 |
|---|---|---|---|
| 2,163,131 | 6/1939 | Porsche | 267/57 |
| 2,169,373 | 8/1939 | Porsche | 267/57 X |
| 2,662,236 | 12/1953 | Kester | 267/57 X |
| 2,779,602 | 1/1957 | Kimbro et al. | 280/721 X |
| 3,047,283 | 7/1962 | Kivell | 188/130 X |
| 3,102,737 | 9/1963 | Williams et al. | 280/414.1 |
| 3,330,558 | 7/1967 | Simons, Jr. | 267/154 X |
| 3,844,583 | 10/1974 | Sakow et al. | 280/721 |
| 4,194,761 | 3/1980 | Falk et al. | 267/57 X |
| 4,544,180 | 10/1985 | Maru et al. | 280/721 X |
| 4,580,808 | 4/1986 | Williams | 267/57 X |

FOREIGN PATENT DOCUMENTS

| 743996 | 1/1933 | France | 267/9 R |
|---|---|---|---|
| 519992 | 11/1957 | Italy | 280/414.1 |
| 1016300 | 1/1966 | United Kingdom | 280/414.1 |
| 1437712 | 6/1976 | United Kingdom | 280/414.1 |

Primary Examiner—George E. A. Halvosa
Attorney, Agent, or Firm—Foley & Lardner

[57] ABSTRACT

A torsion spring cartridge assembly for supporting an oscillating member, the assembly including a bearing assembly, a torque assembly mounted for rotary motion in said bearing assembly, a counter-torque hub, and a set of torsion bars connecting the torque assembly to the counter-torque hub, the cartridge assembly being adapted to be removably mounted in a support structure with the bearing assembly and counter-torque hub mounted in a fixed relation so that the torque assembly is free to rotate within the limits of the torsion bars. A dampener can be provided to restrict the motion of the torque assembly in one direction of motion.

4 Claims, 2 Drawing Sheets

U.S. Patent    Apr. 17, 1990    Sheet 2 of 2    4,917,402
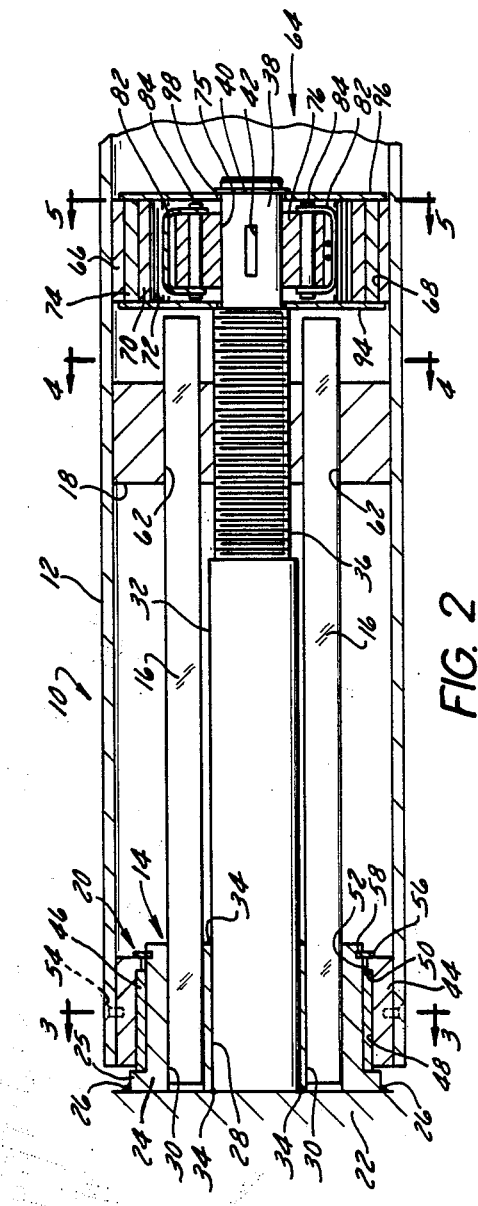
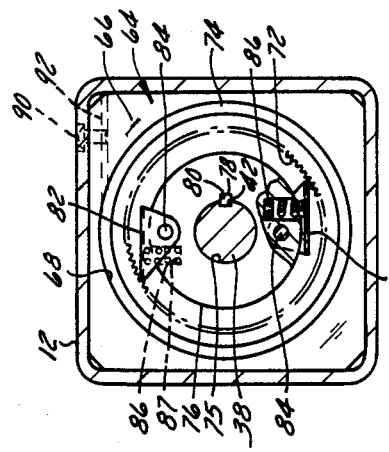
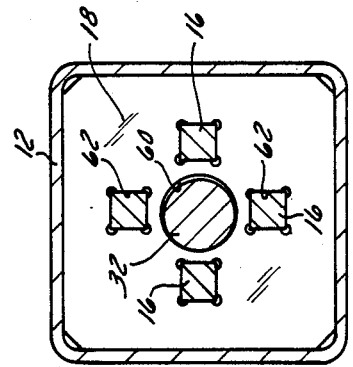
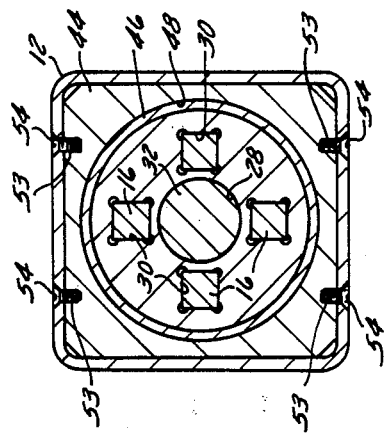

TORSION SPRING CARTRIDGE ASSEMBLY

This is a continuation of co-pending application Ser. No. 781,149 filed on 8/15/85, now abandoned, which relates back to PCT International Application No. PCT/US84/00226 filed 2/16/84.

BACKGROUND OF THE INVENTION

Trailers, whether light duty or heavy duty, require a suspension system to support the axle for the wheels. The suspension system is permanently mounted on the frame of the vehicle and generally includes shock absorbers to dampen excessive vibrations. Serviceability of the suspension system, whether for replacement or repair, is a time consuming and sometimes expensive procedure, particularly where as mobile homes where three or more axles are required, the cost of the suspension system can be considerable because of the code requirements for road travel even though the trailer may be used only for a single trip, i.e., from the point of manufacture to the point of use. The only recoverable costs are the tires which can be removed from the axles of the home, however, the suspension system including the axles must be left intact.

SUMMARY OF THE INVENTION

The present invention relates generally to a torsion spring cartridge assembly which can be readily assembled and removed from the trailer frame.

The cartridge assembly is in the form of a compact unit which can be simply and easily installed in each end of an axle tube. Each assembly is made up from four basic units, a bearing housing, a torque assembly, a counter-torque hub and a set of torsion bars which connect the torque assembly to the counter-torque hub. A dampening assembly may be added to the unit to absorb shock loads, if desired. Maintenance and repair is simplified since each cartridge assembly can be individually removed from the axle tube, and replaced or repaired as required. Another important advantage of the individual cartridge assemblies is the difference in weight compared to a conventional axle and suspension system. The difference can be as much as fifty percent.

IN THE FIGURES

FIG. 2 is a side elevation view of the torsion spring cartridge assembly shown positioned in the axle tube.

FIG. 3 is a view taken on line 3—3 of FIG. 2 showing the torque hub and bearing assembly.

FIG. 4 is a view taken on line 4—4 of FIG. 2 showing the counter-torque hub.

FIG. 5 is a view taken on line 5—5 of FIG. 2 showing the dampening assembly.

DESCRIPTION OF THE INVENTION

Figure 1:
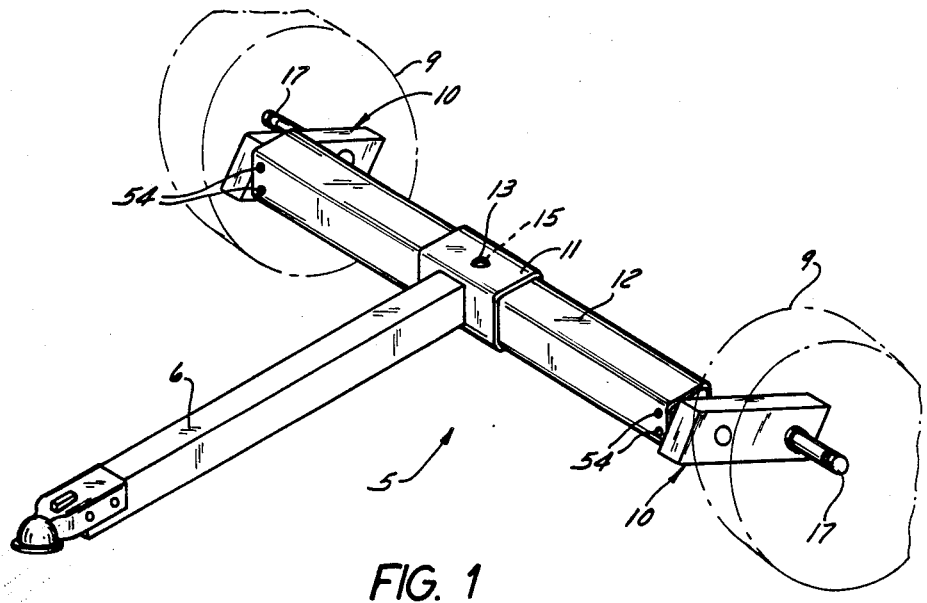
FIG. 1 is a perspective view of a simple trailer frame according to the invention installed in the axle tube.

A simple trailer frame 5 of a type contemplated for use of the invention herein is shown in FIG. 1 and includes a tubular steel tongue 6, an axle tube 12 mounted on the end of the tongue 6, a torsion spring cartridge assembly 10 according to the invention mounted on each end of axle tube 12 and a wheel 9 mounted on each of the torsion spring cartridge assemblies 10. The axle tube 12 is removably mounted on the end of the tongue 6 by means of a close fitting tubular member 11 welded to the end of the tongue 6. The tubular member 11 has the same inner dimension as the outer dimension of the axle tube 12. The member 11 and axle tube 12 are shown having a square configuration, however any other configuration can be used. The axle tube 12 is retained in the tubular member 11 by means of a carriage bolt 13 which passes through openings 15 in member 11 and corresponding holes (not shown) in the axle tube 12. The torsion spring cartridge assemblies 10 are retained in the ends of the axle tube 12 by means of bolts 54. Once assembled the wheels 9 can be mounted on the axle 17 provided on each of the cartridge assemblies 10. It should be apparent that each cartridge assembly is independently serviceable for repair or replacement.

The T-frame trailer described above is designed for light loads only such as required for boats, motorcycles, snowmobiles or light industrial applications. Trailers for heavier loads such as stock trailers, equipment trailers and travel trailers, generally include a supporting frame with one or more axle tubes secured to the frame. Each wheel is then independently supported in the axle tube can can be separately serviced, repaired or replaced. This is of particular significance to the mobile home industry where road codes require a permanent axle suspension system for road travel. Using independently removable torsion spring cartridge assemblies in permanently mounted axle tubes will allow removal of the cartridge assemblies from the axle tubes after the mobile home is set up for reuse by the mobile home manufacturer at a reduced cost for the owner and manufacturer.

TORSION BAR CARTRIDGE ASSEMBLY

As seen in FIG. 2 of the drawings, the torsion bar cartridge assembly 10 is mounted within the square axle tube 12. The assembly 10 generally includes a torque assembly 14, a plurality of torsion bars 16, a counter-torque hub 18 and a bearing assembly 20 for supporting said torque assembly for rotary motion with respect to the axle tube 12. The torsion bars 16 are supported at one end by said torque assembly 14 and are restrained from rotary motion by means of the counter-torque hub 18. It should be noted that these four elements make up the basic torsion spring assembly for one end of the axle tube and are inserted as a single cartridge or unit. With this arrangement serviceability of each cartridge assembly is simplified since each assembly can be separately removed for service, repair and/or replacement as will be more specifically described hereinafter.

THE TORQUE ASSEMBLY

The torque assembly 14 includes a torque member 22 connected to a torque hub 24 by any convenient means such as welds 26. The hub 24 includes a circular bore 28 and a number of square openings 30 spaced radially outward from the axis of the bore 28 at equal intervals. A radial flange 25 is provided at the outer end of the hub 24 and an annular groove 58 is provided at the inner end. A draw bar 32 is secured to the torque hub 24 by means of welds 34 and extends axially through the bore 28 into the tube 12. The draw bar 32 includes a threaded reduced diameter section 36 and a reduced diameter end section 38 having an axially extending groove 42 on the outer circumference. An annular groove 40 is provided at the end of the end section 38. The torque member 22 is representative of one of a number of members that can be used to connect the torque hub to an oscillating member.

The torque assembly 14 is supported in the end of the axle tube 12 by means of the bearing assembly 20. In this regard, the bearing assembly includes a housing 44 and a bearing 46. The housing has an outer configuration conforming to the configuration of the axial tube, in this case square, with a counter bore 48 which terminates at a shoulder 50 formed by means of an inner radial flange 52. A number of threaded holes 53 can be provided in the outer periphery of the housing 44. The bearing 46 is positioned in the bore 48 and abuts the shoulder 50. The housing 44 is retained in the axle tube 12 by means of a number of screws 54 screwed in holes 53. The torque hub 24 is supported in the housing 44 by the bearing 46 and is retained therein by a snap ring 56 positioned in the groove 58 in the hub 24.

The counter-torque hub 18 has an outer configuration also conforming to the inner configuration of the axle tube 12 and is provided with a center bore 60 and a number of square openings 62. The center bore 60 is threaded to operatively engage the threaded section 36 of the draw bar 32. The hub 18 is mounted on the draw bar by turning the hub on the threaded section 36 to a predetermined spaced position with respect to the torque hub 24.

The torsion bars 16 are then inserted through the openings 62 in the counter-torque hub 18 into the openings 30 in the torque hub 24. The bars 16 are held in position in the openings 30 and 62 by means of a plate 94 as described hereinafter. Rotary motion of the torque member 22 will then be resisted by the counter-torque hub 18. It should be noted that the bias force of the bars 16 can be varied by adjusting the distance of the counter-torque hub 18 with respect to the hub 24. The torsion rods can be made of any resilient material from steel to fiberglass depending on the requirement of the particular application.

This is accomplished by removing the plate 94 and pulling the torsion bars 16 out of the openings 30 in the torque hub 24. The counter-torque hub 18 is rotated in one direction to move closer to the hub 24 and in the other direction to move the hub 18 farther away from the torque hub 24. Movement of the hub 18 closer to the hub 24 will increase the force required to rotate the torque arm and movement away will decrease the force. The torsion bars 16 are then reset in the openings 30, and the plate 94 mounted on the draw bar 32 in abutting engagement with the end of section 38.

The counter torque hub 18 can be modified to move without moving the torsion bars 16 out of the torque hub 24. This is achieved by providing threaded holes in the hub 18 which terminate at the central bore 60. Set screws can be provided in the threaded holes to engage the draw bar. Slots corresponding to the threaded holes are provided in the axle tube. The set screw can be screwed into engagement with the draw bar through the slots in the axle tube. The hub has a central bore 60 which can be made larger than the diameter of section 36 on the draw bar to allow for free movement on the draw bar in the axle tube. The hub can then be moved axially within the limits of the slots in the axle tube and set in position by tightening the set screws against the draw bar.

DAMPENING ASSEMBLY

Means can be provided on the end of the draw bar 32 to damp the return motion of the torque member 22. Such means is in the form of a dampening assembly 64. In this regard and referring to FIGS. 2 and 5, the dampening assembly 64 includes a housing 66 having an outer configuration conforming to the configuration of the axle tube and a center bore 68. A spline ring 70 having a series of teeth 72 around the inner diameter is supported in the bore 68 by means of an annular friction ring or pad 74. The friction ring 74 can be formed of a number of friction materials such as clutch brake band material (Raybestos-Manhattan material F451). A rotor 76 having a center bore 75 is mounted on the end section 38 of the draw bar inside of the spline ring 70. The rotor is secured to the draw bar by means of a key 78 positioned in the groove 42 in the end section 38 and a groove 80 provided in the bore 75 of the rotor 76.

The rotary movements of the rotor 76 are transferred to the spline ring 70 by means of a pair of pawls 82 mounted on diametrically opposite sides of the rotor 76. Each of the pawls is supported on the rotor by means of a pivot pin 84 and is biased radially outwardly by means of compression springs 86 positioned in blind bores 87 provided in the rotor 76. The pawls are positioned to engage the teeth 72 in the spline ring.

Referring to FIG. 5, it will be noted that the rotor 76 is free to rotate in a clockwise direction. Counterclockwise rotation of the rotor 76 is resisted by means of the engagement of the pawls 82 with the teeth 72 on the spline ring 70. On engagement of the pawls with the teeth 72, the spline ring will be forced to move in the counterclockwise direction. Rotary motion of the spline ring is resisted by means of the friction ring 74 provided between the spline ring and the bore 68 in the housing 66. In this regard, it should be noted that the spline ring includes 72 teeth spaced at 5 degree intervals. Any movement of less than 5 degrees will not be affected by the dampening assembly. As the amount of rotary motion increases in five degree increments a greater amount of dampening force will be introduced into the torque draw bar.

Means are provided for adjusting the frictional force of the friction ring 74. Such means is in the form of a screw 90 and a slot 92 provided in the housing 66. As the slot 92 is closed, the bore 68 will tighten on the ring 74 increasing the pressure on the spline ring 70.

The dampening assembly 64 is mounted on the end 38 of the draw bar 32 in abutting engagement with the plate 94. The housing 66 is positioned against plate 94 and a second plate 96 is positioned on the end of the section 38 and retained thereon by a snap spring 98 positioned in groove 40. The spline ring 70 has a width slightly smaller than the width of housing 66 to allow for free movement between plates 94 and 96.

Figure 7:
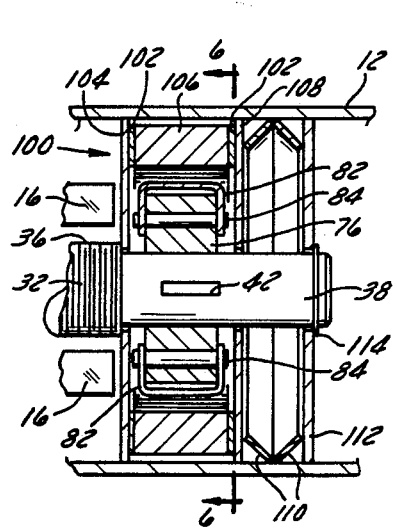
FIG. 7 is a cross section view of the alternate dampening assembly.
Figure 6:
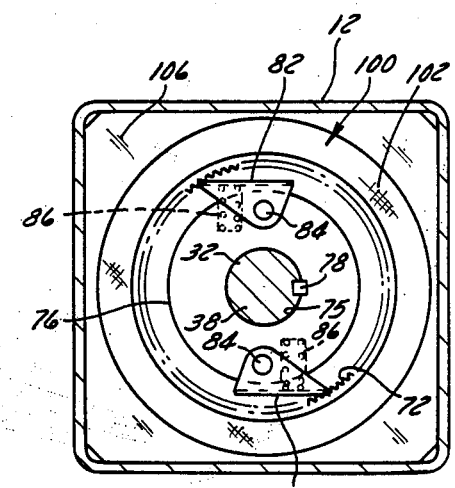
FIG. 6 is a view of an alternate form of dampening assembly taken on line 6—6 of FIG. 7.

An alternate dampening assembly 100 is shown in FIGS. 6 and 7 wherein the return motion of the torque member 22 is dampened by means of radial frictional pads 102. The dampening assembly 100 is mounted on the end section 38 of the draw bar 32 with a first square stator plate 104 abutting the end of the threaded section 36. A rotor 76, as described above, is mounted on the end section 38 with the pawls 82 biased outward by springs 86. A spline ring 106 having 72 teeth is placed on the rotor 76 with one of the friction pads 102 positioned between plate 104 and the spline ring 106. A second stator plate 108 is positioned in the axle tube with the other friction pad 102 located between plate 108 and ring 106.

The friction pads 102 are loaded by means of a pair of Belleville spring washers 110 positioned on the end of shaft section 38 and retained thereon by a washer 112 and a snap ring 114 positioned in groove 40. The amount of friction force can be adjusted by adding washers 112 to the end of the shaft section 38. The dampener 40 operates in the same way as dampener 64 except that the friction force is applied axially rather than radially.

The transfer of motion from the rotor 76 to the spline rings 70 or 106 by the pawls 82 is only representative of one of a number of systems for accomplishing this result. An overrunning clutch or any other one-way transfer mechanism could be used for this purpose. The overrunning clutch would allow free wheeling on wind up of the torsion spring and would lock the friction dampener to the rotor on reverse motion.

RESUME

The torsion spring cartridge assembly disclosed herein is adaptable for use in practically any environment where oscillating motion is encountered. The assembly provides axle support for a rotating member as well as spring suspension for the axle. Dampeners can be provided to damp motion in one direction of oscillation or rotation. Serviceability is simplified since the entire assembly is removable for repair or replacement. The spring rate can be quickly and easily adjusted to accommodate environmental changes such as load, road conditions and weather.

We claim:

1. A T-frame trailer comprising a tubular tongue, a square axle tube removably mounted on one end of said tongue,
a torsion spring cartridge assembly removably mounted in each end of said axle tube,
said cartridge assemblies each including a bearing assembly having an outer configuration corresponding to the square configuration of said axle tube to prevent rotation of said bearing assembly in said axle tube, a torque assembly mounted for rotary motion in said bearing assembly and a counter torque hub having an outer configuration corresponding to the inner configuration of said square axle tube to prevent rotation of said counter torque hub in said axle tube,
a set of torsion bars operatively connecting said torque assembly to said counter-torque hub, one of said cartridge assemblies being removably mounted as a single unit at each end of said axle tube,
and a wheel mounted on each torque assembly.

2. The trailer according to claim 1 wherein said cartridge assembly includes means for dampening the motion of the torsion spring cartridge assembly.

3. The trailer according to claim 1 including means for dampening the motion of the torque hub.

4. A collapsible trailer kit comprising a T-frame including a tubular tongue, a square mounting tube mounted on the end of said tongue, a square axle tube adapted to be removeably mounted in said square mounting tube, and means for securing said axle tube in said mounting tube,
a pair of torsion spring cartridge assemblies adapted to be removeably mounted in the ends of said axle tube,
and a pair of wheels adapted to be mounted on said cartridge assemblies.

* * * * *